United States Patent [19]

Frain

[11] Patent Number: 5,398,279
[45] Date of Patent: Mar. 14, 1995

[54] TELEPHONE APPARATUS WITH CALLING LINE IDENTIFICATION

[75] Inventor: T. J. Frain, Camberley, England

[73] Assignee: Nokia Mobile Phones (U.K.) Ltd., Camberley, England

[21] Appl. No.: 141,808

[22] Filed: Oct. 25, 1993

Related U.S. Application Data

[63] Continuation of Ser. No. 816,868, Jan. 2, 1992, abandoned.

[30] Foreign Application Priority Data

Jan. 11, 1991 [GB] United Kingdom ................. 9100620

[51] Int. Cl.$^6$ .................... H04M 15/00; H04M 15/06; H04M 1/56
[52] U.S. Cl. ..................................... 379/140; 375/142
[58] Field of Search ............... 374/140, 141, 142, 127, 374/159, 276

[56] References Cited

U.S. PATENT DOCUMENTS 4,924,496  5/1990  Figa et al. .......................... 379/142
5,029,196  7/1991  Morganstein .......................... 379/67

FOREIGN PATENT DOCUMENTS 0355777   2/1990  European Pat. Off. ...... H04M 1/66
2014825   2/1979  United Kingdom .......... H04M 1/57
2173069A  10/1986  United Kingdom .......... H04M 1/66

*Primary Examiner*—Stephen Chin
*Assistant Examiner*—Paul Loomis
*Attorney, Agent, or Firm*—Perman & Green

[57] ABSTRACT

A portable cellular telephone capable of recognizing a Calling Line Identifications (CLI) signal. The telephone comprises a memory for storing telephone numbers and a counter for storing the respective number of calls received from telephone numbers stored in the memory. Preferably the counter comprises for each number stored in the memory an associated portion (counter field) of the same memory. The telephone may be adapted to display, e.g. on LCD, the number of calls received from telephone numbers stored in the memory. Hence the user can review at a glance how many times a particular caller has made an incoming call.

17 Claims, 4 Drawing Sheets

TELEPHONE APPARATUS WITH CALLING LINE IDENTIFICATION

This is a continuation of application Ser. No. 07/816,868, filed on Jan. 2, 1992, abandoned.

This invention relates to a telephone apparatus adapted to respond to a signal conveying a number identifying the source of an incoming telephone call. Specifically the identifying number may be the telephone number of the telephone making the incoming call.

BACKGROUND OF THE INVENTION

It is known, for example in the context of cellular radio telephone systems, for the subscriber number of the telephone from which a call is originated to be transmitted in binary code to the telephone receiving the call. This is known in the art as Calling Line Identification (CLI).

Prior art telephones have been adapted to respond to CLI signals and have been provided with a facility for displaying the telephone numbers of incoming calls. Hence the user can see the telephone number before answering the call. Prior art telephones responsive to CLI have been provided with a specific number of designated memory locations, e.g. four, for storing the CLI number of an incoming call. This has the drawback that if more calls are received than the number of locations which have been reserved for CLI information then some information will necessarily be lost or not retained. For example if there are four CLI memory locations and five calls are received, the telephone number of one of the calls cannot be stored. It may be that one of the numbers already stored in the CLI memory is lost in order to keep a record of the four most recent calls, or simply that no further numbers are recorded once the CLI memory is full. Moreover, if a call is received from the same telephone number more than once, the whole number will be recorded on each occasion. This is a disadvantage because it does not efficiently use the CLI memory space and also because it is not easy for the user to assimilate that he has received a call from the same telephone number several times. Usually it is arranged that the CLI numbers are shown on the telephone display one at a time and in this case the user would have to remember the telephone number from one appearance to the next in order to realize that two (or more) calls were from the same number.

GB-A-2014825 discloses a telephone apparatus in which the telephone number of a caller is stored in a memory and can be recalled at a later stage if the call is not answered initially. A counter stores the total number of stored telephone numbers and this total can be displayed. However, this total is the total number of telephone numbers stored and gives no indication of how many times a particular telephone number has called.

SUMMARY OF THE INVENTION

According to the present invention there is provided a telephone apparatus comprising means for responding to a signal conveying a number identifying the source of an incoming telephone call, the telephone apparatus comprising memory means having a plurality of numeric fields for storing numbers in encoded form, and means for registering the respective number of calls received from identifying numbers corresponding to the encoded numbers stored in the numeric fields.

In the present specification the term 'field' relates to a portion of memory intended for storing a specific item of data of a given type such as a telephone number (numeric characters only) or a name (alphabet or alphanumeric characters). A 'record' comprises a collection of individual fields linked by a common feature, e.g. all items of data (fields) relating to the same telephone number.

A telephone apparatus in accordance with the present invention has the advantage that it registers the number of calls received from each of the numbers stored in the numeric fields of the memory means. Therefore, as long as a number has been entered into the telephone number memory means, details of calls will not be lost even when calls are received from numerous other telephone numbers.

Suitably the registering means comprises respectively for each numeric field as associated portion of said memory means. Hence each numeric field has a respective call registering facility associated therewith.

In a preferred embodiment, display means are included for displaying the identifying number of an incoming call, said display means being adapted to display the number of calls received from identifying numbers stored in the numeric fields. Hence the user can see at a glance the total number of calls received from any and all of the numbers stored in the identifying number memory means. This information can be reviewed at any convenient time by the user.

The registering means may comprise respective counters. Means may be provided for selecting the numeric field containing the encoded number corresponding to the number identifying the source of the incoming call and the counter associated with the selected numeric field is then incremented by one unit. Means may also be provided for resetting the counters to zero.

In one mode of operation the display means may be adapted to display only those identifying numbers stored in the numeric fields which have a non-zero number stored in the respective associated counter. Hence the user can readily review only those numbers stored in memory from which calls have been received.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
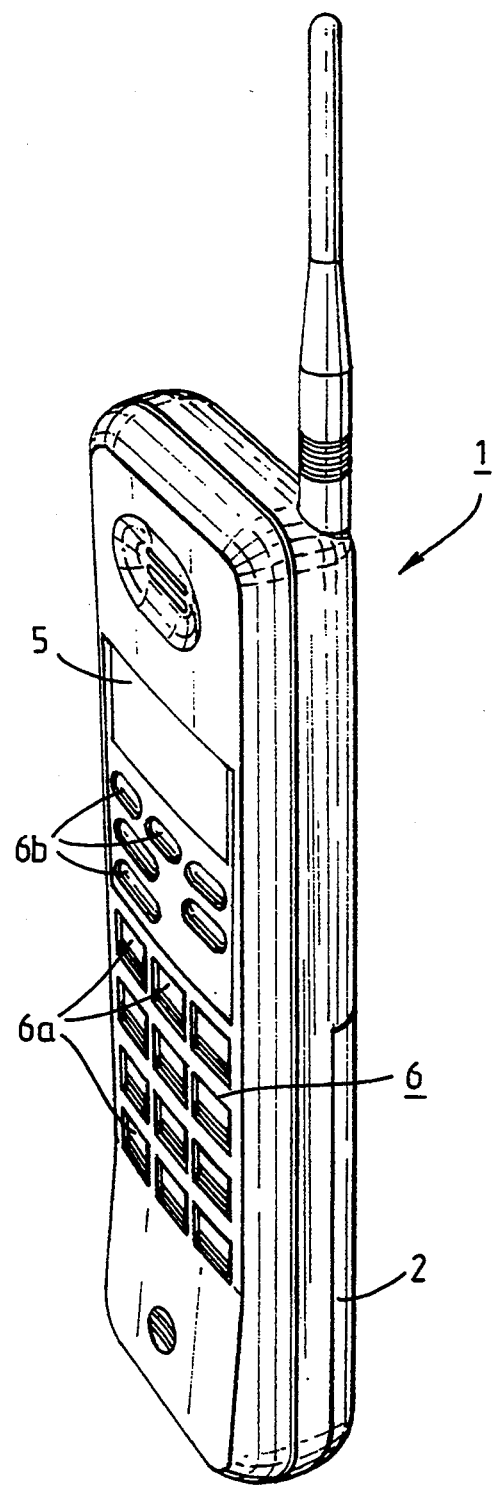
FIG. 1 is a perspective view of a portable cellular telephone in accordance with the invention.

The telephone apparatus shown in FIG. 1 is a portable cellular telephone 1 powered by a rechargeable battery pack 2. The telephone 1 includes a transceiver and all the other features conventionally found in a cellular telephone, as shown schematically in FIG. 2. Since these aspects of the telephone are not directly relevant to the instant invention no further details will be given here, except to say that a microprocessor 4 (see FIG. 2) is employed to control all the basic functions of the telephone 1 and to control the keypad and display functions. Alternatively, however, the telephone functions may be controlled by a master microcomputer, while the keypad and display functions are under the control of a separate slave microcomputer coupled to communicate with the master microcomputer. Additionally a memory 100 is provided for storing subscriber telephone numbers, as described in more detail below.

The user-interface of telephone 1 comprises a display, e.g. a liquid crystal display 5, itself well-known in the art and a keypad 6 on the front of the telephone 1. The display is coupled to and regulated by the microprocessor 4 in the usual manner. The keypad 6 essentially comprises two main sets of keys, namely alphanumeric keys 6a associated with alphanumeric data especially for dialing telephone numbers, but also for entering alphanumeric data into the telephone number store 100; and a set of function keys 6b for enabling various predetermined functions or operations.

The keys 6a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. The keys 6a are also associated with alphabet information, as again is quite conventional. The alphabetic rather than numeric data is selected for example by preceding the alphanumeric keystroke with another predetermined keystroke or set of keystrokes, specifically using the function keys in the data entry mode as discussed in more detail below.

As is usual in cellular telephones, the keys 6b include a "SEND" and "END" key for respectively initiating and terminating a telephone call. Another key, specifically located in the top left-hand corner is an "ON/OFF" key for turning the telephone on and off, i.e. by connecting and disconnecting the battery pack power supply. Another of the function keys may be a menu or function key labeled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing the "MENU" or "FUNCTION" key. The relevant menu is shown to the user in words or abbreviations on the display panel 5. For example, the user may be able to select the ringing tone by appropriate menu selection.

Figure 3:
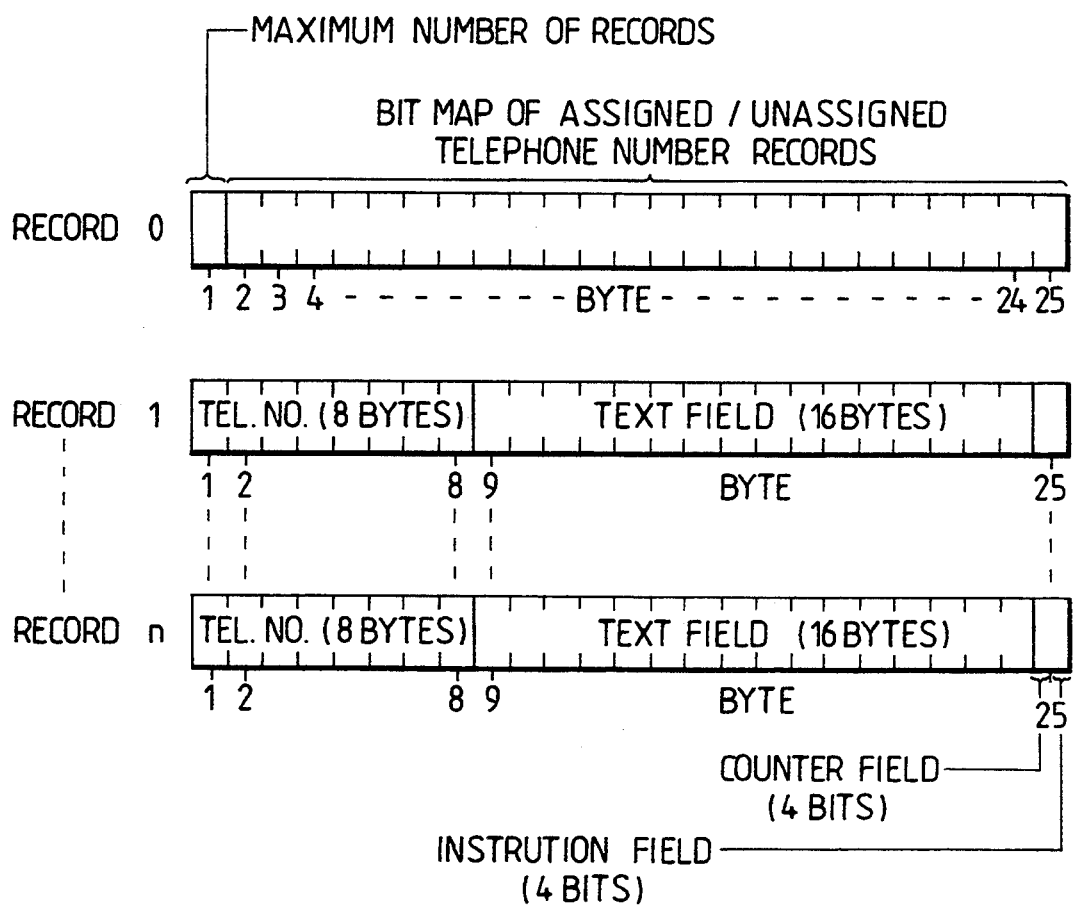
FIG. 3 is a schematic diagram showing the structure and organization of the telephone number store of the telephone in FIG. 2.

The organization of the memory, suitably an EEPROM, constituting the telephone number store 100 will now be described with reference to FIG. 3.

The telephone number store comprises n+1 records, each record having a length of 25 bytes (200 bits). Record 0 is merely an information record and contains information on the size and allocation of the telephone number store. This record is the first in the memory 100 and constitutes record number 0, i.e. abbreviated subscriber number 0. The header, like the n other records, has a length of 25 bytes and is structured as follows. The first byte is used to store the maximum number of records in the telephone number store, and the remaining 24 bytes are used as a bit map to indicate unassigned and assigned records. For example a binary "1" indicates an unassigned record and binary "0" indicates an assigned record. To this end the first telephone number record (Record 1) is represented by the most significant bit (bit 8) in byte 2 (i.e. abbreviated subscriber number 1), whilst the last subscriber number record (maximum 192) is represented by the least significant bit (bit 1) in byte 25 of the header.

The n subscriber number records each consist of a numeric field 8 bytes long for storing the directory number; a text field, which is 16 bytes long, for storing any accompanying optional text, such as the name of the subscriber; a counter field 4 bits (½ byte) long; and an instruction field also 4 bits (½ byte) long.

Figure 4:
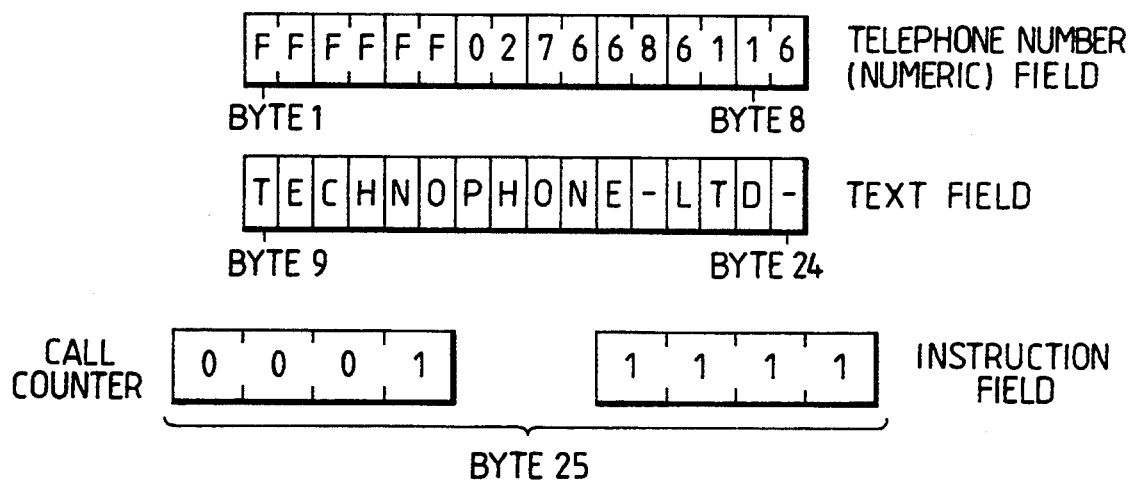
FIG. 4 is a schematic diagram of one of the records in the telephone number store in FIG. 3.

The subscriber number is stored right-justified in the "numeric" field (bytes 1 to 8) and filled to the left with "F" (in hexadecimal), as shown in FIG. 4 for the telephone number 0276 686116. In the case of an empty or deleted subscriber number record, the numeric field (bytes 1 to 8) is filled with F's (hexadecimal).

The text is stored left-justified in the text field (bytes 9 to 24) and filled to the right with spaces, ASCII code "20" (hexadecimal), as shown in FIG. 4 for the words "TECHNOPHONE LTD". In the case of an empty or deleted record, the text field (bytes 9 to 24) is filled with ASCII code spaces "20" (hexadecimal).

The counter field (the four most significant bits of byte 25) stores the number of times a call has been received from the telephone number contained in that record. So, for example, as shown in FIG. 4 a call has been received from the telephone number 0276 686116 once before.

The instruction field (the four least significant bits of byte 25) are available for storing special instructions to modify the manual operation of the telephone. If this field is empty (0000) the operation of the telephone will proceed uninterrupted in the normal manner. However, special instructions may be programmed into this field by the user from the keyboard. For example, in FIG. 4 the code 1111 is used as a "TELEPHONE BUSY" instruction which can be used to block calls from selected telephone numbers, as described in more detail below.

Figure 2:
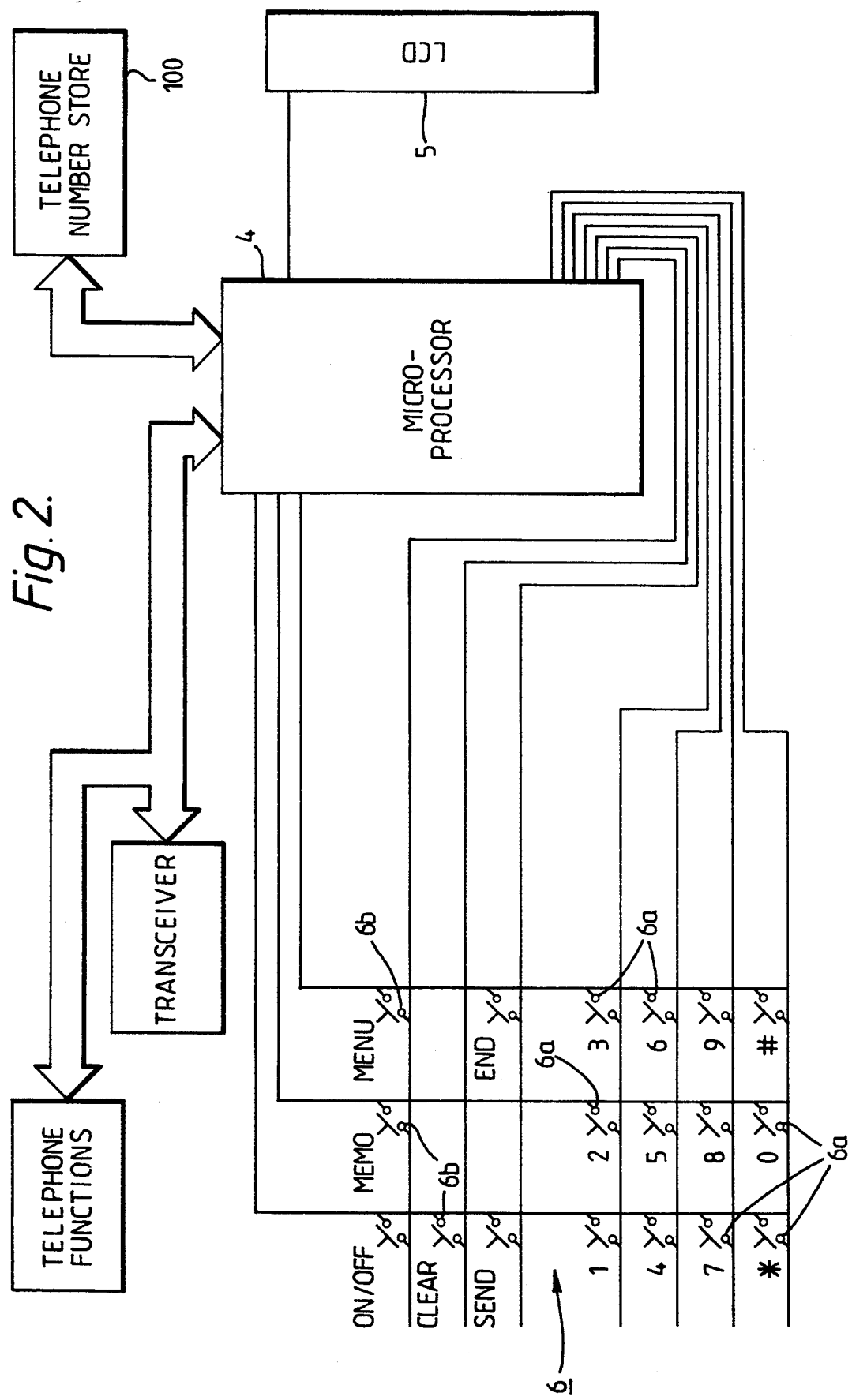
FIG. 2 is a schematic diagram of the main features in the telephone of FIG. 1.
Figure 5:
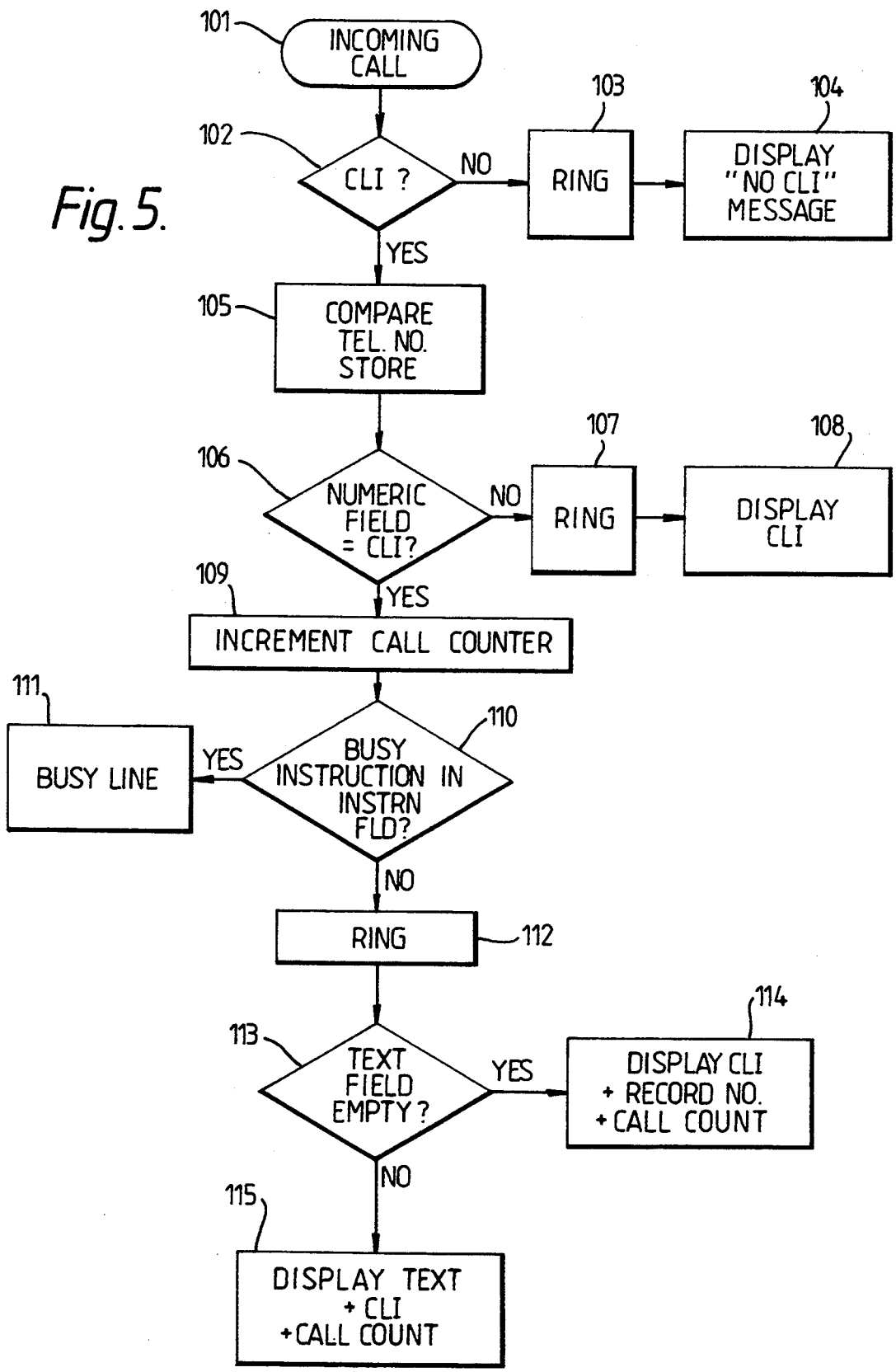
FIG. 5 is a flowchart depicting a set of steps, which may be used by the microcomputer in the telephone in FIG. 2 insofar as implementation of the telephone number store is concerned.

FIG. 5 is a flowchart which may be used to implement the operation of the microprocessor 4 of FIG. 2 insofar as use of the telephone number store 100 is concerned. The flowchart begins at block 101 when the portable telephone receives an incoming call. At block 102 the telephone establishes the telephone number of the caller if a calling line identification (CLI) signal is present. If there is no CLI signal the flow proceeds to block 103 where the telephone is rung and the call will proceed in the conventional manner. Also, as indicated at block 104, the telephone may display a message such as "NO CLI" to indicate that no CLI information is available.

On the other hand, if a CLI signal is present, the telephone number will be established in known manner and the flow will proceed from block 102 to block 105. The telephone numbers stored in the numeric fields of the telephone number store 100 are compared with the CLI number. If none of the stored numbers match the CLI number, see block 106, the flow proceeds to block 107. The telephone is rung and the CLI number is displayed on the display, as illustrated at block 108. Additionally a message such as "NOT IN MEMORY" may be displayed to indicate to the user that the number of the incoming calls is not stored in memory 100.

The CLI number may remain on the display for reference purposes even after the call has been answered and the user may have the opportunity to permanently transfer the displayed number into the telephone number store 100 while the call is in progress. To this end, e.g. by pressing any of the alphanumeric keys 6a, the message on the display changes, for example to "STORE?". At this point the user can confirm that he wishes to store the displayed number by pressing a "STORE" key disposed among the keys 6b. In response the display 5 will show the first available record or memory location. The user may store the number at that or indeed at any other available location of his choice, and also store text to accompany the telephone number, e.g. the caller's name, in accordance with the general procedure for entering data as discussed in greater detail below. If the user does not press the "STORE" key while the "STORE?" message is displayed the CLI number will not be transferred into the telephone number store 100.

On the other hand, if one of the records in the telephone number store 100 is found at block 106 to contain in its numeric field a number corresponding to the CLI, then the counter field of that record will be incremented by one unit as shown at block 109. Thus if the current state of the call counter was 0001 for the selected record as shown in FIG. 4, the counter would be incremented to 0010.

Flow then proceeds to block 110 at which a check is made on the state of the instruction field. If this contains a "BUSY SIGNAL" instruction, e.g. 1111, then the telephone will respond with a busy (engaged) signal, indicated at block 111, as if the telephone were in use. Hence the telephone has a call screening facility, which permits calls from selected telephone numbers to be blocked. The caller will receive a busy or engaged tone.

If, at block 110, the instruction field is found to be empty (contents (0000)), flow will proceed to block 112 and the telephone will be rung. Then, at block 113, a check is made on the text field of the selected record. If the text field does not contain any information (i.e. 16×F(hex)) the telephone number stored in the numeric field of the selected record will be displayed on LCD 5, as indicated at block 114. Also, the record number will be displayed, e.g. in the form "RECORD 99", thus giving the user the maximum amount of information available, in the absence of text, which may help to identify the caller. Additionally the display will show a message indicating the number of times a call has been received from the same telephone number since the call counter was last cleared. This message may, for example, be in the form "CALL COUNT: 2", indicating that this is the second call which has been received from the number displayed. The three items of information, i.e. the CLI number, the record number, and the call count may be displayed simultaneously if the capacity of the display permits, or the various items of information may be displayed sequentially.

If, at block 113, the text field is found to contain information, then the flow proceeds to block 115 and the telephone will display the text stored in encoded form in the text field of the selected record, e.g. "TECHNOPHONE LTD", see FIG. 4. Also, the CLI number viz. 0276 686116 in this case, may be displayed together with the call count, e.g. in the form "CALL COUNT: 2".

All of the information contained in the telephone number store 100 may be entered or programmed by the user from the keypad 6. For example, the store mode may be accessed by pressing the "STORE" key disposed among the keys 6b. The user then enters the desired telephone number up to 16 digits long using the alphanumeric keys 6a. To store the number the "STORE" key is pressed again. In response the display 5 will show the keyed telephone number e.g. 0276 686116, followed by the first available record or memory location, indicated for example as "RECORD 005", assuming records 001 through 004 are already assigned. The record number can be changed at this stage using the "#" key to scroll up to the next location (record 006), or using the "*" key to reach the previous location (record 004). Alternatively, the number keys 6a may be pressed to enter a specific location, e.g. by pressing the key "9" twice for record number 99. The "STORE" key is pressed to store the entered number at the desired location. The display then returns a prompt such as "ENTER NAME". At this stage the alphabet function of the numeric keys 6a is enabled. In general each number key has three sequential alphabetic characters associated therewith. For example the key "8" also has the letters "T" "U" and "V" associated with it. Thus, at the "ENTER NAME" stage, a single press of the numeric key will display the first letter (i.e. "T" for the "8" key), two key presses will display the second letter (i.e. "U" for the "8 key"), and three key presses will display the third letter (i.e. "V" for the "8" key). A fourth key press displays the number itself. Further key presses cause this sequence to be repeated. Hence upto 16 alphanumeric characters can be entered into the text field using the alphanumeric keys 6a. The text characters are stored by pressing the "STORE" key once again. If the "STORE" key is pressed before any text has been entered the text field will be left empty. Whether or not text has been entered the last "STORE" keypress will cause the display to show a further prompt such as "BUSY ON", indicating the status of the instruction in the instruction field. This instruction can be toggled between "BUSY ON" and "BUSY OFF" using for example either the "#" or "*" keys. As indicated above, "BUSY OFF" will store 0000 in the instruction field of the selected record permitting calls originating from that number to proceed in the normal manner, whereas "BUSY ON" will store 1111 in the instruction field of the selected record causing a busy or engaged signal whenever a call is received from the subscriber number stored in that record.

Pressing the "STORE" key once more will store all the data which has just been entered in the chosen location and the display will return to its normal state.

The user may at any time review what calls have been received using the "MENU" key. For example by pressing the "MENU" key followed by "5" the display may show the message "REVIEW CALLS". To enable this feature the user presses, for example, the "STORE" (or "ENTER") key. On the other hand by pressing the "#" or "*" keys the message toggles between "REVIEW CALLS" and "ERASE CALL COUNT". If the "STORE" (or "ENTER") key is pressed while the "ERASE CALL COUNT" message is displayed, the counter fields of all records will be reset to zero (0000). On the other hand if the "STORE" (or "ENTER") key is pressed while the "REVIEW CALLS" message is displayed, the display will show the first record which has a non-zero call count, for example: "0276 686116 TECHNOPHONE LTD CALL COUNT: 2". By pressing the "#" key the display will show the next record which has a non-zero call count. Successive records with a non-zero call count can thus be recalled by repeatedly pressing the "#" key. When all records with a non-zero call count have been displayed they will be displayed again in rotation as the "#" key is pressed repeatedly again. The non-zero call-count records can be reviewed in reverse order by pressing the "*" key.

In view of the foregoing it will be evident to a person skilled in the art that various modifications may be made within the scope of the present invention. For example the telephone number store including the call counter may be implemented and configured in any suitable manner and indeed the call counter may be implemented in a memory distinct from the telephone number store. Furthermore, a telephone in accordance with the present invention need not necessarily include a call screening facility in which case less memory space is required.

Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. Telephone apparatus comprising means for responding to a signal conveying a number identifying the source of an incoming telephone call, the telephone apparatus comprising:
   a user programmable telephone number store with memory means having a plurality of numeric fields for storing numbers in encoded form, and
   means for selectively registering the respective number of incoming telephone calls received by the telephone apparatus that have identifying numbers corresponding to the encoded numbers stored in the numeric fields, the registering means registering an incoming telephone call only if the number identifying an incoming telephone call has been previously stored in the user programmable telephone number store.

2. Telephone apparatus as claimed in claim 1, wherein the registering means comprises respectively for each numeric field an associated portion of said memory means.

3. Telephone apparatus as claimed in claim 1, including means for displaying the identifying number of an incoming call, said display means being adapted to display the number of calls received from identifying numbers stored in the numeric fields.

4. Telephone apparatus as claimed in claim 1 wherein the registering means are in the form of respective counters.

5. Telephone apparatus as claimed in claim 4 including means for selecting the numeric field containing the encoded number corresponding to the number identifying the source of the incoming call, and means for incrementing the counter associated with the selected numeric field.

6. Telephone apparatus as claimed in claim 4 including means for resetting the counters.

7. Telephone apparatus as claimed in claim 5 including means for resetting the counters.

8. Telephone apparatus comprising means for responding to a signal conveying a number identifying the source of an incoming telephone call, the telephone apparatus comprising
   a user programmable telephone number store with memory means having a plurality of numeric fields for storing numbers in encoded form, and
   means for automatically selectively registering the respective number of incoming telephone calls received by the telephone apparatus that have identifying numbers corresponding to the encoded numbers stored in the numeric fields, the registering means registering an incoming telephone call only if the number identifying an incoming telephone call has been previously stored in the user programmable telephone number store, and
   means for displaying the identifying number of an incoming call, said display means being adapted to display the number of calls received from identifying numbers stored in the numeric fields.

9. Telephone apparatus as claimed in claim 8 wherein the registering means are in the form of respective counters.

10. Telephone apparatus as claimed in claim 9 including means for selecting the numeric field containing the encoded number corresponding to the number identifying the source of the incoming call, and means for incrementing the counter associated with the selected numeric field.

11. Telephone apparatus as claimed in claim 8, including means for resetting the counters.

12. Telephone apparatus as claimed in claim 9, wherein in one mode of operation the display means are adapted to display only those identifying numbers stored in the numeric fields which have a non-zero number stored in the respective associated counter.

13. Telephone apparatus as claimed in claim 10, wherein in one mode of operation the display means are adapted to display only those identifying numbers stored in the numeric fields which have a non-zero number stored in the respective associated counter.

14. Telephone apparatus as claimed in claim 11, wherein in one mode of operation the display means are adapted to display only those identifying numbers stored in the numeric fields which have a non-zero number stored in the respective associated counter.

15. Telephone apparatus as claimed in claim 1, further comprising user actuated means for resetting the registering means.

16. Telephone apparatus as claimed in claim 8, further comprising user actuated means for resetting the registering means.

17. Telephone apparatus comprising means for responding to a signal conveying a number identifying the source of an incoming telephone call, the telephone apparatus comprising:
   a user programmable telephone number store with memory means having a plurality of numeric fields for storing numbers in encoded form; and
   means for registering, in individual counter fields, the respective number of incoming telephone calls received by the telephone apparatus that have identifying numbers corresponding to the encoded numbers stored in the numeric fields, the registering means including user actuated means for resetting the individual counter fields, wherein a user can reset the number of incoming telephone calls recorded in the counter fields for each of the individual encoded numbers stored in the numeric fields without changing the encoded numbers stored in the numeric fields.

* * * * *